(12) United States Patent
Richardson et al.

(10) Patent No.: US 7,153,904 B2
(45) Date of Patent: Dec. 26, 2006

(54) STARCH/CARBOXYLATED POLYMER COMPOSITES

(75) Inventors: Paul H. Richardson, Vernon, NJ (US); Robert A. Skorge, Somerville, NJ (US); Maximilian M. R. Koxholt, Franklin Park, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 0 days.

(21) Appl. No.: 10/145,232

(22) Filed: May 13, 2002

(65) Prior Publication Data

US 2003/0027901 A1 Feb. 6, 2003

Related U.S. Application Data

(60) Provisional application No. 60/309,063, filed on Jul. 31, 2001.

(51) Int. Cl.
*C08B 31/00* (2006.01)
*C08G 63/91* (2006.01)

(52) U.S. Cl. ......... 525/54.21; 523/201; 525/54.26; 525/54.23; 525/54.24

(58) Field of Classification Search ........... 524/47, 524/48, 49, 50, 35, 37, 38, 44, 45, 46; 525/54.2, 525/54.23, 54.24, 54.26, 54.21; 426/103, 426/321, 661; 523/201
See application file for complete search history.

(56) References Cited

U.S. PATENT DOCUMENTS

| | | | |
|---|---|---|---|
| 4,298,729 A | 11/1981 | Cheng et al. | 536/102 |
| 4,983,583 A | 1/1991 | Ridoux | 514/54 |
| 5,424,088 A | 6/1995 | Christianson et al. | 426/578 |
| 5,538,751 A * | 7/1996 | Carter et al. | 426/661 |
| 5,641,349 A * | 6/1997 | Koubek et al. | 106/206.1 |
| 5,718,770 A | 2/1998 | Shab et al. | 127/65 |
| 5,895,804 A | 4/1999 | Lee et al. | 525/54.3 |

FOREIGN PATENT DOCUMENTS

| | | |
|---|---|---|
| EP | 0321216 | 6/1989 |
| EP | 0 911 361 A1 | 4/1999 |
| JP | 10-33125 | 2/1998 |
| WO | WO 00/32064 | 6/2000 |

OTHER PUBLICATIONS

PO1-38, World Congress of Food and Science,Seung-Taik Lim, Jung-Ah Han and James N. Bemiller "Heat treatment of starch-gum mixtures for viscosity modification".
XP-002223994 Abstract—"Study on Rheological Property of Starch Modified by Acrylic Copolymer".
XP-002223995 Abstract—"Modified Starch".
XP 002223996 Abstract—Granular Starch Composition Preparation . . . .
Lim, S.T., Han, J.A, Lim, H.S., and BeMiller, J.N.; "Modification of Starch by Dry Heating with Ionic Gums", Annual Report for 2000, Whistler Center for Carbohydrate Research, 1160 Food Science Building, Purdue Univ rsity, West Lafayette, IN 47906.
Christianson, Donald d., Fanta, George F., and Bagley, Edward B.; "Complexes between starch and poly(ethylene-co-acrylic acid)—viscosity and gel rheology of jet-cooked dispersions", Carbohydrate Polymers 17 (1992) 221-226.
Abdulmola, N.A., Hember, M.W.N., Richardson, R.K. and Morris, E.R.; "Effect of Xanthan on the small-deformation rheology of crosslinked and uncrosslinked waxy maize starch", Carbohydrate Polymers 31 (1996) 65, 78.
Christianson, D.D., Hodge, J.E., Osborne, D., and detroy, R.W., "Gelatinization of Wheat Starch as Modified by Xanthan Gum, Guar Gum and Cellulose Gum"; American Association of C real Chemists, Inc. 1981, 58(6):513.

* cited by examiner

*Primary Examiner*—Ana Woodward
(74) *Attorney, Agent, or Firm*—Karen G. Kaiser

(57) ABSTRACT

This invention relates to an inhibited non-solubilized granular starch modified by less than 5% of a carboxylated polymer. In addition, a process is provided wherein a non-solubilized, substantially granular starch is mixed with a carboxylated polymer, dried to form a starch/carboxylated polymer blend and then physically treated to form a starch/carboxylated polymer composite. Further, this invention relates to the improved industrial and food products prepared from these starch/carboxylated polymer composites.

6 Claims, 8 Drawing Sheets

Figure 7. Effect of the preparation method on the viscosity profile of a 1:100 CMC-waxy corn starch composite

STARCH/CARBOXYLATED POLYMER COMPOSITES

This application claims priority from provisional application 60/309,063 filed Jul. 31, 2001.

FIELD OF THE INVENTION

This invention relates to an inhibited non-solubilized granular starch modified by less than 5% of a carboxylated polymer. In addition, a process is provided wherein a non-solubilized, substantially granular starch is mixed with a carboxylated polymer, dried to form a starch/carboxylated polymer blend and then physically treated to form a starch/carboxylated polymer composite. Further, this invention relates to the improved industrial and food products prepared from these starch/carboxylated polymer composites.

BACKGROUND

Native and modified starches have been used for many years in the food industry to provide processed foods with improved product appearance and increased consumer appeal. Starches can impart desirable properties to food products, ranging from shape retention and sliceability to desirably grainy and pulpy textures in sauces and dressings. Sources of starch include roots, root-like or tuber plants and cereals.

When native starch granules are dispersed in excess water and heated they become hydrated and swell. The swelling of the granules results in an increase in viscosity which, in unmodified starch, peaks at temperatures in the range of 56° to 95° C. This increase in viscosity is a desired property in many food and industrial applications. Swollen, hydrated starch granules, however, are quite fragile. When a granular starch slurry is maintained at temperatures greater than 80° C., the starch granules begin to fragment and the viscosity breaks down. Shear or conditions of extreme pH also tend to disrupt and fragment the granules, so that the starch polymers dissociate and become solubilized, leading to a rapid breakdown of the initially high viscosity.

Both the swelling of the starch granules and the breakdown in viscosity can be inhibited by treating the starch with chemical reagents that introduce covalent intermolecular bridges or crosslinks between the starch molecules. The crosslinks reinforce the associative hydrogen bonds holding the granules together, restricting the swelling of the starch granules, which inhibits the disruption and fragmentation of the granules. This allows the starch to delay solubilization during cooking and results in a desirably "shorter" texture instead of a "slimy" and cohesive texture.

A reduction in the disruption and fragmentation of the granules can also be achieved according to the method described in U.S. Pat. No. 5,718,770 wherein the thermal treatment of starch granules results in properties characteristic of the crosslinked starches. Accordingly, chemically crosslinked or thermally inhibited starches are used in many applications where a stable viscosity starch paste is needed.

Other means of reducing the rapid breakdown in starch solution viscosity have been explored. For example, U.S. Pat. Nos. 5,424,088 and 4,298,729 describe a composition of a carboxylated polymer, which may be xanthan, and starch which is characterized by reduced dissolution in water and increased acid, heat and shear stability. Both processes require that the starch be at least partially gelatinized (solubilized). Because of the resultant increase in viscosity caused by the partial gelatinization, the process is limited to relatively low solids contents and drying becomes an undesirably energy-intensive process. Further, since gelatinization disrupts the starch granule, solutions of the xanthan/starch compositions are unable to maintain a satisfactorily high viscosity or provide delayed gelatinization during cookout.

Carboxylated polymer and starch compositions have been investigated for use in a variety of applications. For example, WO 00/32064 describes a controlled-release, digestible carbohydrate material (possibly starch) which is coated, encapsulated, entrapped or embedded in a crosslinked polysaccharide matrix. U.S. Pat. No. 5,895,804 describes a thermosetting system which may comprise a polysaccharide (including starch) and a carboxylated polymer. However, both of these systems require high amounts, greater than 5% by weight, of the expensive carboxylated polymer.

There is an ongoing need to provide starch compositions which are able to address the problem of breakdown in starch viscosity and do not require high levels of expensive components, toxic chemicals and an energy-intensive processes.

The present invention provides a process for obtaining a novel, granular starch modified by less than 5% by weight of carboxylated polymer which possesses these properties to a degree exhibited only by chemically crosslinked or thermally inhibited starches. The invention further relates to the improved foods prepared from these composites.

SUMMARY OF THE INVENTION

This invention relates to an inhibited non-solubilized granular starch modified by less than 5% of a carboxylated polymer. In addition, a process is provided wherein a non-solubilized, substantially granular starch is mixed with a carboxylated polymer, dried to form a starch/carboxylated polymer blend and then physically treated to form a starch/carboxylated polymer composite. Further, this invention relates to the improved industrial and food products prepared from these starch/carboxylated polymer composites.

The novel process of the present invention comprises mixing the starch, carboxylated polymer and a solvent; drying the mixture to form a blend; and physically treating the dried blend with heat or irradiation to give the composite. Drying and subsequent physical treatment may be optionally conducted in one step.

The composites prepared according to this method are inhibited and are characterized by properties equivalent to those obtained via chemical crosslinking such as stability to heat, shear and pH changes. The process may be manipulated to produce composites with variety of desirable solution properties including, for example, non-cohesive, short textures, higher viscosities, delayed gelatinization and/or improved solution stability.

This invention also relates to the improved foods and industrial products prepared from the composites which exhibit improved freeze/thaw stability, viscosity and texture, as well as reduced syneresis in certain applications.

DETAILED DESCRIPTION

This invention relates to an inhibited non-solubilized granular starch modified by less than 5% of a carboxylated polymer. In addition, a process is provided wherein a non-solubilized, substantially granular starch is mixed with a carboxylated polymer, dried to form a starch/carboxylated polymer blend and then physically treated to form a starch/carboxylated polymer composite. Further, this invention relates to the improved industrial and food products prepared from these starch/carboxylated polymer composites.

All starches and flours (hereinafter "starch") which substantially retain their granular form and are substantially non-solubilized may be suitable for use herein and may be derived from any native source. A native starch or flour as used herein, is one as it is found in nature. Also suitable are starches and flours derived from a plant obtained by standard breeding techniques including crossbreeding, translocation, inversion, transformation or any other method of gene or chromosome engineering to include variations thereof. In addition, starch or flours derived from a plant grown from artificial mutations and variations of the above generic composition which may be produced by known standard methods of mutation breeding are also suitable herein.

Typical sources for the starches and flours are cereals, tubers, roots, legumes and fruits. The native source can be corn, pea, potato, sweet potato, banana, barley, wheat, rice, sago, amaranth, tapioca, arrowroot, canna sorghum, and waxy or high amylose varieties thereof. Particularly useful starches are waxy starches, including waxy maize, waxy tapioca, waxy pea, waxy wheat, waxy rice, waxy potato, waxy sorghum, and waxy barley. As used herein, the term "waxy" is intended to include a starch or flour containing at least about 95% by weight amylopectin and the term "high amylose" is intended to include a starch or flour containing at least about 40% by weight amylose.

Conversion products derived from any of the starches, provided such conversion does not completely destroy the granular nature of the starch, including fluidity or thin-boiling starches prepared by oxidation, enzyme conversion (e.g., with alpha-amylase, beta-amylase, pullulanase, isoamylase, or glucoamylase), acid hydrolysis, heat and or acid dextrinization, and or sheared products may also be useful herein.

Chemically modified starches may also be used, provided such modification does not completely destroy the granular nature of the starch. Such chemical modifications are intended to include, without limitation, crosslinked starches, acetylated and organically esterified starches, hydroxyethylated and hydroxypropylated starches, phosphorylated and inorganically esterified starches, cationic, anionic, nonionic, and zwitterionic starches, and succinate and substituted succinate derivatives of starch. Such modifications are known in the art, for example in Modified Starches: Properties and Uses, Ed. Wurzburg, CRC Press, Inc., Florida (1986).

Physically modified starches may also be used, provided the modification does not completely destroy the granular nature of the starch. As used herein, a starch that has been completely solubilized indicates a starch in which the granular nature has been completely destroyed. A starch which has an incompletely destroyed granular nature is a starch which retains some granular character such as starches in which the granules swell but are not completely solubilized. Thus the useful starches of the present invention include all starches which have a substantially granular nature, whether the granules are swelled or not, as long as they are not completely solubilized.

The composite compositions of the present invention also comprise a carboxylated polymer. The term polymer is intended to include oligomers, and biopolymers, wherein the biopolymers are naturally occurring polymers. The polymers may be modified or unmodified. Such modifications may include but are not limited to cross-linking, neutralization, hydrolysis, enzyme treatment and partial esterification. The polymers have a weight average molecular weight of at least 1,000 and preferably 10,000 or more. The actual molecular weight of the polymer is not a limiting factor.

The synthetic carboxylated polymers which may be used in the present invention include, without limitation, poly (acrylic acid) and carboxylic-acid-functionalized polyesters and polymers prepared from monomers such as vinyl acetate ("VA"), (Meth)acrylic acid, maleic anhydride ("MAnh"), maleic acid, itaconic acid ("IA"), crotonic acid ("CA"), and beta-carboyl ethyl acrylate ("BCEA"). As used herein (Meth)acrylic denotes both acrylic and (methyl)acrylic acid and esters thereof.

Other carboxylated polymers useful in the present invention include, without limit, alginate, xanthan, carboxymethylcellulose, low methoxyl and high methoxyl pectin, pectic acid, hyaluronic acid, polyaspartic acid and polyglutamic acid, oxidized starch, oxidized guar, and carboxymethylated starch. These examples are not limiting and the starches of the present invention may be used in combination with virtually any polycarboxylated polymer. Preferred carboxylated polymers are xanthan, low methoxyl pectin, carboxymethylcellulose and polyacrylic acid.

The present invention describes an inhibited starch and carboxylated polymer composite composition and the process for making these composites. This process effectively results in encapsulating or "coating" the outer surface of the starch granule with the carboxylated polymer, which, after drying forms a blend. The blend is then physically treated to form the composite so that upon solubilization, the swelling of the starch is inhibited.

The process is achieved by mixing the carboxylated polymer in a solvent, followed by addition of the starch. Alternatively, the carboxylated polymer may be added, neat or as a solution, to the starch in a solvent. Further, the starch and carboxylated polymer may be mixed in the absence of the solvent, and then the solvent is added to the mixture of the starch and carboxylated polymer. For example, the solvent may be sprayed on the dry blend. In each case, the starch is in a granular, substantially non-gelatinized form.

The solvent is preferably water.

An acceptable range of carboxylated polymer to starch expressed in weight percent ratios is about 1:500 to about 1:20; particularly from about 1:200 to about 1:20; and especially particularly from about 1:200 to 1:50. The ratio of carboxyl:hydroxyl groups in the carboxylated polymer versus starch is also greater than 1:80.

After adding the granular starch, carboxylated polymer and solvent in any order, the mixture is agitated. Agitation may be accomplished by all forms of mechanical mixing, such as a Hobart mixer, enclosed mixing vessel or extruder. Any suitable aqueous or organic solvent may be used to facilitate the agitation. The preferred solvent is water in a concentration of about 45–75% wt %/wt %. The starch/carboxylated polymer mixture may be optionally dewatered using conventional methods such as filtration and centrifugation.

The starch/carboxylated polymer mixture is then dried to a moisture content of less than 20%. Drying methods may include, without limitation, spray-drying, freeze-drying, air-drying, flash-drying and vacuum-drying, particularly air-drying, with the proviso that the drying method does not completely destroy the granular nature of the starch. The dried starch/carboxylated polymer mixture may optionally be ground.

After drying, the starch/carboxylated polymer blend is physically treated to form an inhibited composite. Before physical treatment, acid may be optionally used to vary the degree of physical inhibition exhibited by the treated composite. The physical treatment may include heat or radiation treatment (e.g. infrared and Cobalt(60)), particularly heat treatment. Heat treatment may be carried out at temperatures of from about 60° C. to about 200° C., or from about 80° C. to about 120° C., provided that if temperatures greater than 120° C. are used, the starch/carboxylated polymer blend has been dried to a moisture content of less than about 1% moisture. The heat treatment must be carried out in such a way to ensure that the starch is not completely gelatinized. Particularly suitable methods of heat treatment include extrusion, oven and fluidized bed treatment.

The time required to complete inhibition of the composite is dependent upon the means of heating and by the composition and moisture content of the starch/carboxylated polymer mixture. For example, a 1:100 wt/wt % carboxymethyl cellulose ("CMC"): waxy corn starch mixture may be heated in an oven from about 1 second to about 24 hours, as long as the starch does not completely lose its granular nature. Generally, in the temperature range of from about 80° C. to about 120° C., treatment times of less than four hours are sufficient to give a composite with a desirable degree of inhibition. All other variables being equal, longer treatment times result in composites with greater inhibition. Likewise, treatment to form the composites at higher temperatures results in more rapid achievement of inhibition compared to treatment at lower temperatures.

Additionally, methods in which heat transfer is more efficient, such as the fluidized bed method, require less time to complete desired degrees of inhibition. Further, less heat treatment is generally required for mixtures containing higher levels of carboxylated polymer.

The mixing and/or drying and/or physical treatment steps may be carried out in a process reactor that is capable of performing all unit operations or by using appropriate pieces of equipment for the individual process steps.

The starch/carboxylated polymer composites prepared by the aforementioned process are formed by "coating" the outer surface of the starch granule, leaving the granule substantially intact, though the granule may swell. Solutions of these composites exhibit inhibition and have desirable properties similar to those of chemically cross-linked starches. These properties include stability to heat, shear and pH changes. Additional properties include a non-cohesive short texture with no lumping, higher viscosity and delayed gelatinization during cook-out with improved solution stability. Further, the process provides a substantially white composite, particularly suitable for food applications.

Additionally, composites prepared by first mixing the starch and polycarboxyated polymer and then adding the solvent, for instance by spraying the solvent on the starch/polycarboxylated polymer mixture, then drying the mixture to produce a blend and physically treating the blend, provide substantially improved delayed in gelatinization during cook-out. For example, when heated at 95° C., a solution of the composite prepared according to this method exhibits a delay in the gelatinization of the starch of at least 2 minutes, in some cases up to 10 minutes. In contrast, at 95° C., the starch of the corresponding untreated blend immediately begins to swell and results in almost immediate gelatinization of the starch.

The composites of this invention may be used to improve a variety of products including food and beverages, paper and paper board, pharmaceuticals (including controlled release applications), adhesives and personal care products. Food and beverages is intended to include, but is not limited to, sauces and gravies, salad dressings and mayonnaises, cultured products such as yogurts and sour cream, puddings, desserts, baked goods, instant foods, soups, candies including gelled candies, batters, breadings, and coatings and beverages, particularly baked goods, gelled candies, batter, breadings and coatings, particularly as opacifiers for cream soups and non-dairy foods and in fruit/pie fillings as well as bulking agents in dietary foods. In adhesive applications, the composites of the present invention are useful as fillers or film-forming agents. Personal care products comprising the composites of the present invention are intended to include, but are not limited to creams and lotions, mousses and gels, hair care products, and deodorants.

EXAMPLES

The following examples are presented to further illustrate and explain the present invention and should not be taken as limiting in any regard. All percents/parts used are on a weight/weight basis, and temperature is in Centigrade unless otherwise noted.

The following starches were used throughout the examples: waxy corn starch (AMIOCA®, commercially available from National Starch and Chemical Company) and chemically cross-linked starch (FIRMTEX® commercially available from National Starch and Chemical Company). The following carboxylated polymers were used throughout the examples: xanthan (Keltrol® from Kelco), carboxymethylcellulose ("CMC", commercially available from Hercules, Incorporated) and low methoxyl pectin (commercially available from Hercules, Incorporated).

Procedure A: Measurement of Inhibition

The inhibition of the composites is indicated by comparing the Brabender viscosities of the composite with their corresponding untreated blends. Viscosity profile are obtained with a C. W. Brabender viscoamylograph (obtainable from C. W. Brabender Instruments, Inc.). The physically treated composite sample (27.0 g) and water (473.0 g) are slurried together without pH adjustment and added to the cooking chamber of the viscoamylograph. The slurry is ramped to 50° C., followed by controlled heating at 1.5° C./min from 50–95° C. The solution is then held at 95° C. for 20 minutes, followed by cooling at 1.5° C./min from 95–50° C. Throughout this temperature profile, the viscosity of the solution is measured. From the peak viscosity (highest viscosity observed on the viscosity curve recorded on the chart recorder of the viscoamylograph) and the final viscosity (viscosity at 95° C.+10 minutes), the % breakdown is calculated based on the following equation:

% Breakdown viscosity=[(Peak viscosity−Viscosity at 95° C. after 10 minutes)/Peak Viscosity]× 100.

Those composites that display a lower percentage breakdown compared to the corresponding untreated blends of the carboxylated polymer and granular starch, are deemed inhibited. In addition, where the composites do not exhibit a peak viscosity or the final viscosity is higher than the peak viscosity, the composite is also deemed inhibited.

Example 1

Preparation of a Starch/Carboxylated Polymer Composite

A 1:100 xanthan:waxy corn starch composite was prepared by air drying, followed by heat treatment in a pre-heated oven according to the following procedure.

Xanthan (25 g) was added to 2.5 liters of de-ionized water and the mixture stirred using a mechanical paddle (Baldor Electric Co., Electric Lab Stirrer with a strade blade impeller) for more than 1 hour, until the solution is fully hydrated. Starch powder (1666 g) was added to the 1% xanthan solution and the slurry stirred for 1 hour in a Ross Mixer. Additional starch (834 g) was added and stirred for a further 1 hour in the Ross Mixer. The mixture was then air-dried until the resultant powder had less than 20% moisture content (moisture level measured using a CSC Scientific Digital Moisture Balance). The powder was ground and filtered through a 60 mesh size screen.

Example 2

Effect of Carboxylated Polymer:Starch Ratio.

Xanthan:waxy corn starch (1:20, 1:100 and 1:200) composites were prepared according to the procedure detailed in Example 1, varying only the relative amount of xanthan and starch used for each sample. The level of inhibition for each sample was then measured according to Procedure A.

Figure 1:
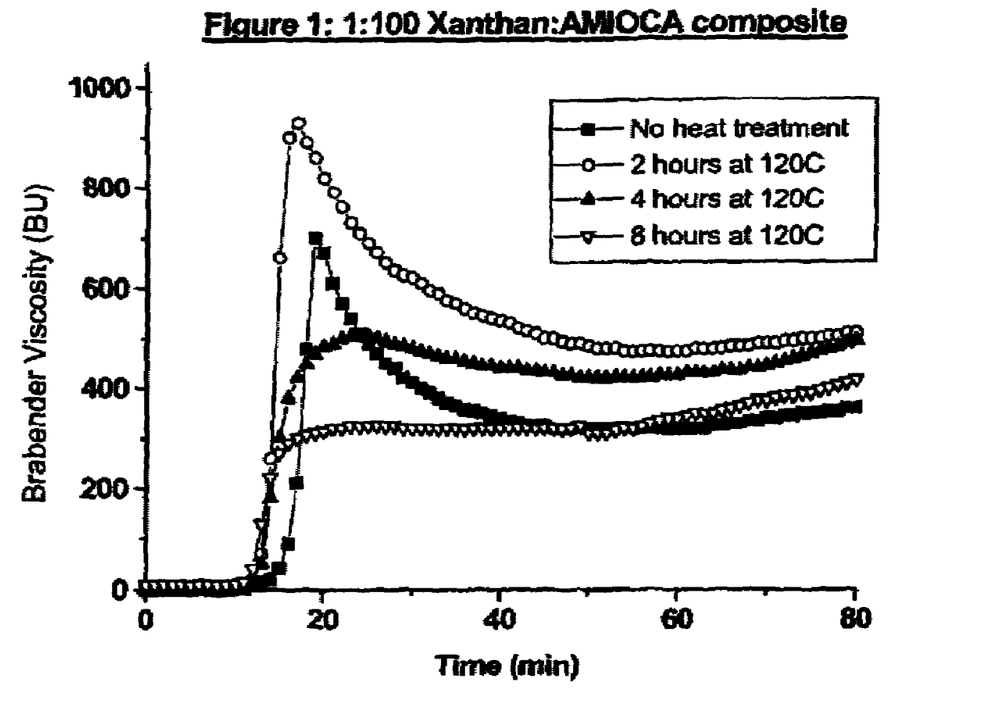
FIG. 1 depicts the viscosity of a 1:100 xanthan:waxy corn starch composite with various levels (0–8 hours) of heat treatment.
Figure 2:
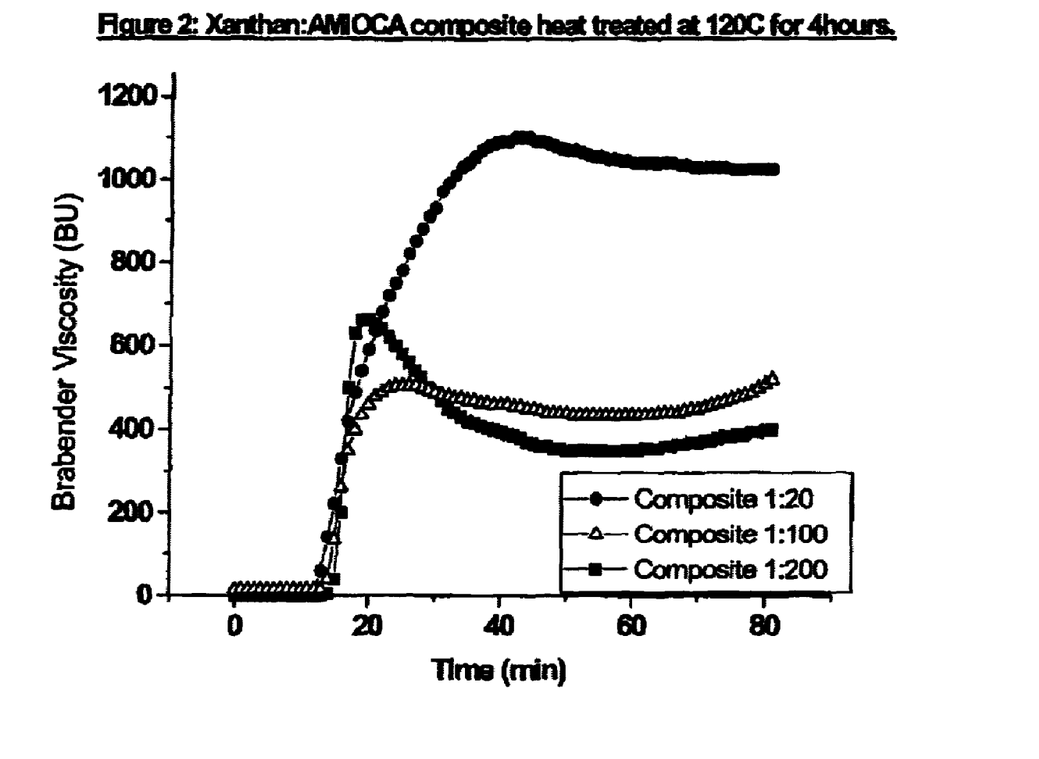
FIG. 2 depicts the viscosity of different ratios of a xanthan:waxy corn starch composite heat treated at 120° C. for four hours.

As is shown by FIG. 2, samples containing higher levels of xanthan showed progressively greater degrees of inhibition.

Example 3

Effect of Types of Carboxylated Polymer upon the Composite

Three samples of 1:100 carboxylated polymer:starch composites were prepared as described in Example 1. In one sample, the polycarboxylated polymer was xanthan, in the second, carboxymethylcellulose and in the third, a 50:50 combination of xanthan and carboxymethylcellulose. Each composite was heat treated for 4 hours at 120° C.

Figure 3:
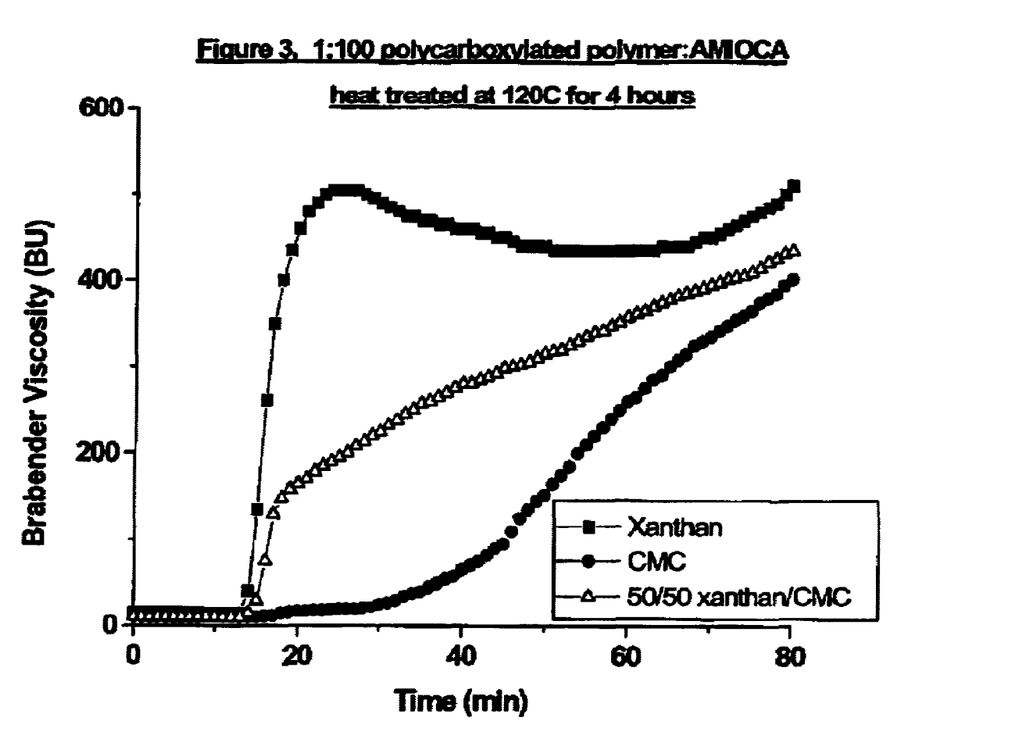
FIG. 3 depicts the viscosity of a 1:100 polycarboxylated polymer:waxy corn starch composite heat treated at 120° C. for four hours in which the polycarboylated polymer has been varied.

Composites made with different polycarboxylated polymers had different viscosity profiles. For example, as FIG. 3 demonstrates, unlike the composites containing xanthan, the carboxymethylcellulose composite possessed a delayed viscosity increase.

Example 4

Effect of Temperature upon the Heat-Treatment of the Composite Preparation

A 1:100 CMC/waxy corn starch composite was prepared as described in Example 1. This composite was heat treated in a fluidized bed reactor ("FBR"). The composite was added to the FBR at room temperature. The FBR was then ramped up to 120° C. and for a second sample to 150° C. respectively. Samples were obtained once the FBR had reached 120° C. (t=0) and at 150° C. (t=0), respectively. For the sample heated to 150° C., an additional sample was removed after 180 minutes at 150° C. (t=180).

The Brabender viscosities were measured for these heat-treated composites, but in this case, the Brabender profile was performed at pH3 and at 5% composite solids. The heat-treated composite sample (23.0g), 50 ml of an aqueous solution of citric acid monohydrate (prepared by diluting 387 g of citric acid monohydrate to 1000 ml in a volumetric flask) and water (407 g) were slurried and added to the cooking chamber of the viscoamylograph. The aqueous buffer solution of citric acid monohydrate was prepared by mixing 1.5 volumes of solution A with 1.0 volumes of solution B, where solution A is prepared by dissolving 210.2 grams of citric acid monohydrate with sufficient purified water in a volumetric flask to make 1 liter and solution B is prepared by dissolving 98.0 grams of tri-sodium citrate dihydrate with sufficient purified water in a volumetric flask to make 1 liter. The slurry was ramped to 60° C., followed by controlled heating at 1.5° C./min from 60–92° C. The solution was then held at 92° C. for 15 minutes.

Figure 4:
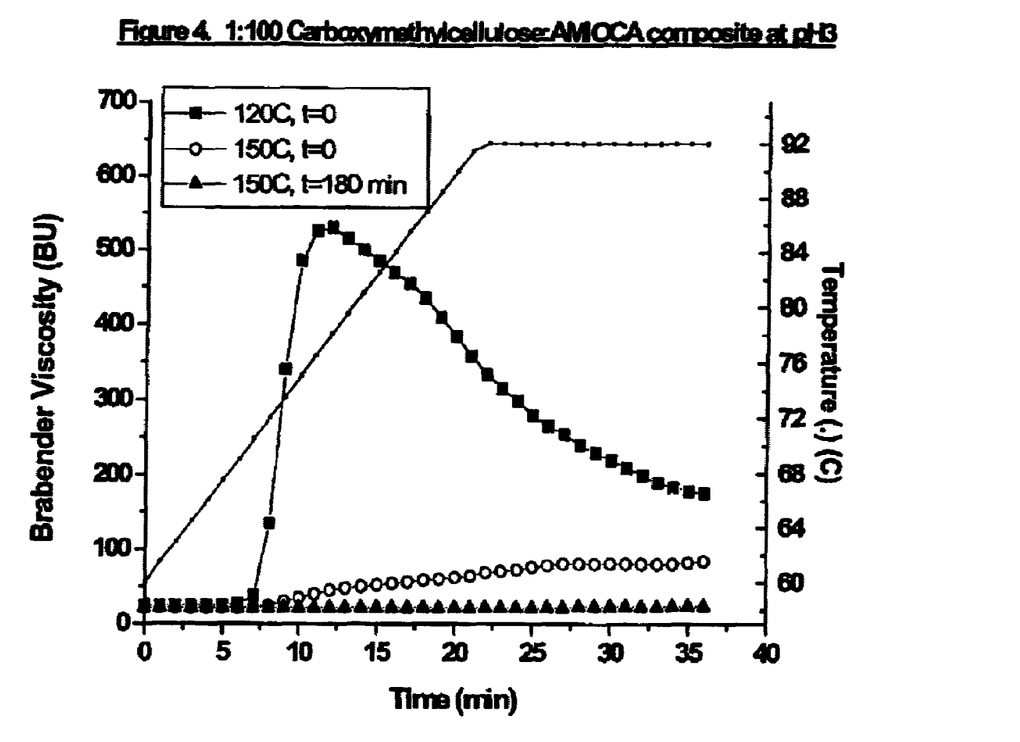
FIG. 4 depicts the viscosity of a 1:100 carboxymethylcellulose:waxy corn starch composite with various levels of heat treatment.

As FIG. 4 illustrates, samples prepared at a temperature above 120° C. showed a significant increase in inhibition, even at relatively short treatment times.

Example 5

Comparison of Properties of Composites and Blends

A 1:100 xanthan:waxy corn starch composite was prepared according to the following procedure. Waxy corn starch (750 g) was slurried at 30% concentration. Xanthan (7.5 g) was dispersed at 0.5% concentration. The starch slurry and xanthan solution were combined using a mechanical paddle (Baldor Electric Co., Electric Lab Stirrer with a straight blade impeller) for 1 hour. This slurry, which was at room temperature, was spray dried. Spray drying conditions were: Inlet temperature 220° C., outlet temperature 95–° C., atomizing air pressure 30 psi. Spray drying lasted for 1.5 hours. The sample collected was passed through a 60 mesh size screen. The material was heat treated in a pre-heated oven at 120° C. for 4 hours and its level of inhibition measured according to Procedure A.

This composite was compared to a material prepared from a starch that was was solubilized prior to drying as described in U.S. Pat. No. 4,298,729. Briefly, jet cooked (138°) waxy corn starch (460 g) was combined with xanthan (4.6 g) as a 0.5% solution using a straight blade mixer and spray-dried under the following conditions: Inlet temperature 220° C., outlet temperature 95–100° C., atomizing air pressure 30 psi. Spray drying lasted for 1.5 hours. The sample collected was passed through a 60 mesh size screen and heat-treated in a pre-heated oven at 120° C. for 4 hours. The sample's inhibition was measured according to Procedure A.

Figure 5:
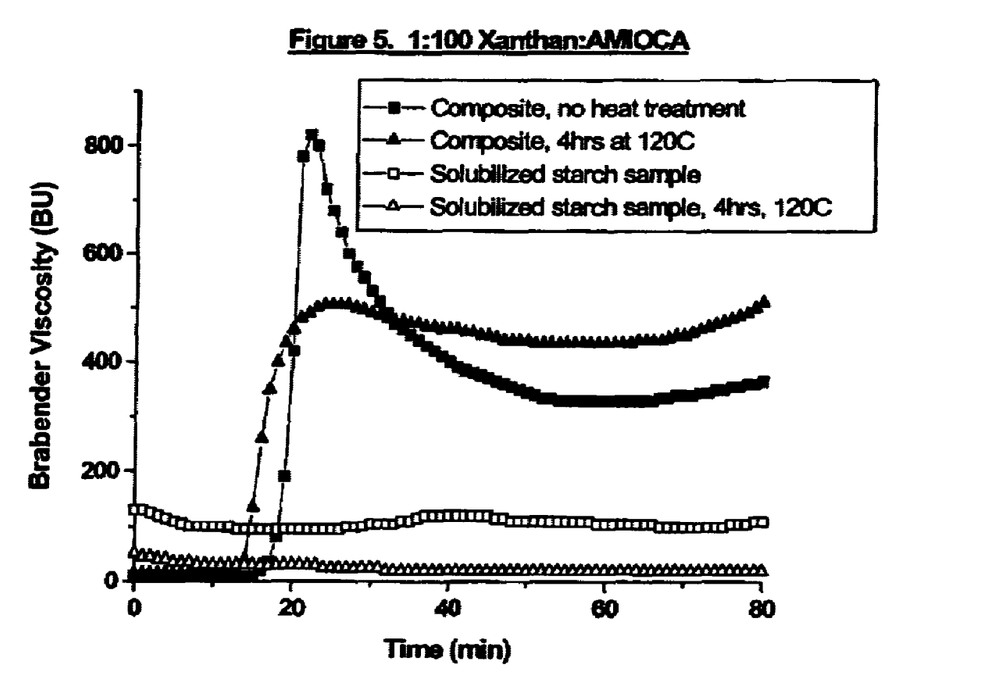
FIG. 5 depicts a 1:100 xanthan:waxy corn starch composite with various levels of heat treatment and drying.

As demonstrated by the results recorded in FIG. 5, the composite material was desirably more viscous than the solubilized starch materials prepared as described by U.S. Pat. No. 4,298,729.

Example 6

Effect of Type of Starch on the Composite Properties

A 1:100 xanthan: potato starch composite was prepared according to the procedure of Example 1. The level of inhibition was measured according to Procedure A and compared to a sample of potato starch alone.

Figure 6:
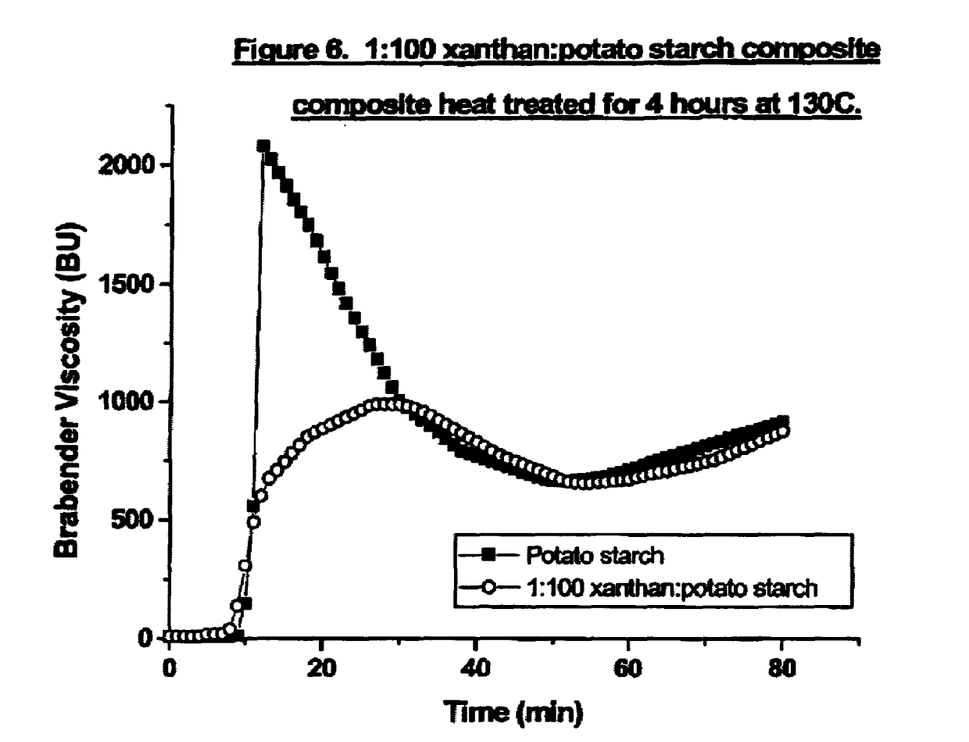
FIG. 6 depicts a 1:100 xanthan:waxy corn starch composite compared to a potato starch, both of which were heat treated at 130° C. for four hours.

As demonstrated by the values in FIG. 6, formation of the carboxylated polymer/starch composite provided significant inhibition for potato starches as well as corn starches described in the previous examples.

Example 7

Figure 7:
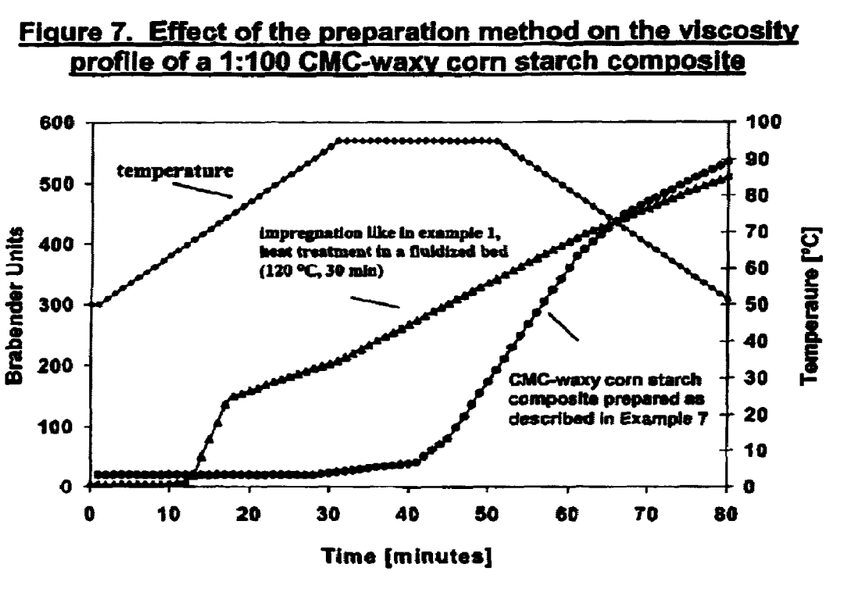
FIG. 7 depicts the effect of the preparation method on the viscosity profile a 1:100 carboxymethylcellose:waxy corn starch composite.

Effect of the Preparation Method on the Viscosity Profile of the Final Composite A dry-blend (384 g, 12% moisture) of carboxymethylcellulose (CMC) and a waxy corn starch (CMC:Starch=1:100) was loaded in a "HobartMixer" (type N-50; Hobart Corporation, Troy, Ohio, US). While mixing the blend (equipment setting 1) 342 g water were sprayed onto the dry blend within 5 min. Subsequently, the moistened blend (50.3% moisture) was mixed for 0.5 hours. The resulting mixture was air-dried until the moisture content of the powder was less than 20%. The dried powder was then heat-treated for 4 hours at 120° C. in a pre-heated oven. FIG. 7 compares the viscosity profile of the composite product prepared according to this method and a 1:100 CMC-waxy corn starch composite that was impregnated as described in Example 1 and heat treated in a fluidized bed for 30 min at 120° C.

The data presented in FIG. 7 demonstrates that differing viscosity profiles can be obtained by varying the impregnation and heat treatment method. Therefore, it is possible to meet specific application needs by changes in the preparation method.

Example 8

Effect of Starch Modifications on the Composite Properties

Composite of 1:100 carboxymethylcellulose:starch were prepared as described in Example 1. The starch used was a native waxy corn starch and a chemically cross-linked. Both composites were heat treated at 120° C. for 4 hours and their degree of inhibition measured according to Procedure A.

Figure 8:
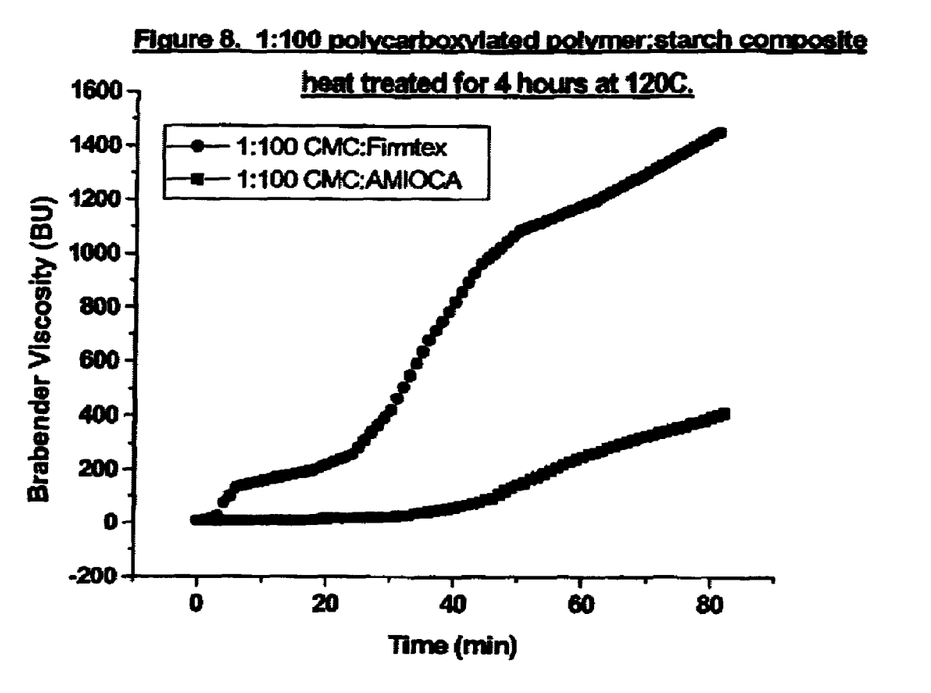
FIG. 8 depicts the viscosity of a 1:100 polycarboxylated polymer:starch composite heat treated at 120° C. for four hours in which the starch has been varied.

As FIG. 8 below illustrates, the composite containing the chemically cross-linked starch showed a unique double plateau in its Brabender viscosity as compared to the native waxy corn starch.

We claim:

1. A composite composition comprising a carboxylated polymer coated onto a non-solubilized starch wherein the weight ratio of carboxylated polymer to non-solubilized starch is less than about 1:20 and the composite demonstrates inhibition, wherein the starch is a waxy starch.

2. The composite composition of claim 1 wherein the weight ration of carboxylated polymer to starch is between about 1:200 to about 1:50.

3. The composite composition of claim 1 which, when heated at a temperature of 95° C., has a delay in the onset of viscosity of at least 2 minutes.

4. The composite composition of claim 1 wherein the carboxylated polymer is selected from the group consisting of xanthan, low methoxyl pectin, carboxymethylcellulose and polyacrylic acid.

5. A composite composition comprising a carboxylated polymer and non-solubilized starch wherein the weight ratio of carboxylated polymer to non-solubilized starch is less than about 1:20 and the composite demonstrates inhibition, wherein the non-solubilized starch is chemically crosslinked and the Brabender viscosity profile demonstrates a double plateau.

6. The composite composition of claim 5, wherein the non-solubilized starch is a waxy starch.

* * * * *